INVENTORS
HENRY NORTON
HUBERT V. NORTON
DOUGLAS E. NORTON
LESLIE B. NORTON

Aug. 17, 1965  H. NORTON ETAL  3,200,686
FEED MECHANISM
Filed July 1, 1963  5 Sheets-Sheet 3

INVENTORS
HENRY NORTON
HUBERT V. NORTON
Douglas E. NORTON
LESLIE B. NORTON
BY

ATTORNEYS

Aug. 17, 1965   H. NORTON ETAL   3,200,686
FEED MECHANISM
Filed July 1, 1963   5 Sheets-Sheet 5

INVENTORS
HENRY NORTON
HUBERT V. NORTON
DOUGLAS E. NORTON
LESLIE B. NORTON
BY

ATTORNEYS 3,200,686
FEED MECHANISM
Henry Norton, Hubert Veare Norton, Leslie Buckingham Norton, and Douglas Edwin Norton, all of Horley, Surrey, England, assignors to Norton Tool Company Limited, Horley, Surrey, England, a company of Great Britain
Filed July 1, 1963, Ser. No. 292,055
Claims priority, application Great Britain, July 4, 1962, 25,693/62
8 Claims. (Cl. 83—277)

This invention relates to feed mechanisms for feeding material in continuous form, such as metal strip and particularly, although not exclusively, to feed mechanisms for presses.

A number of feed mechanisms are available for incrementally feeding strip metal to a press but they generally suffer from one or more disadvantages. When the strip is operated upon by the press in more than one stage it is particularly important that the increments by which the strip is fed should be closely equal in length so that accurate registration of the several stages will occur. Various means are used for ensuring registration at the press such as trigger stops for triggering operation of the press by the strip and pilot pins for adjusting the position of the strip by the press, but there are presses without such means and there are other cases where such means cannot conveniently be used. Even when such means are used, it is important that the feed shall be sufficiently accurate for no greater correction to be necessary than can be effected by the registering means; in some cases the possible correction is very small.

Previous feed mechanisms have employed wedging clamps having balls or rollers engaging the strip and moving in inclined guides which jam the balls or rollers against the strip when there is relative movement between the clamp and the strip. However, such clamps require this relative movement which is of indeterminate extent before positive clamping is achieved. Feed mechanisms incorporating hydraulic or pneumatic pistons and electric solenoids are also known. However, all these previous arrangements have limited accuracy of registration and the rate at which they can feed strip accurately is severely limited. Attempts to increase the rate of feed tends to lead to lack of synchronisation.

According to the present invention a feed mechanism for material in continuous form comprises a stationary clamp for the material, a movable clamp for the material, means for reciprocating the movable clamp, a cam and cam follower mechanism for opening and closing the movable clamp, and a cam and cam follower mechanism for opening and closing the stationary clamp, the cam or the cam follower of each of the said mechanisms being mechanically coupled to the means for reciprocating the movable clamp to move in synchronism with the reciprocation of the movable clamp.

The preferred sequence for opening and closing the clamps is to close the movable clamp and then open the stationary clamp when the movable clamp is close to one end of its stroke (for example bottom dead centre) and to close the stationary clamp and then open the movable clamp when the movable clamp is close to the other end of its stroke (for example top dead centre) in the reciprocatory cycle of the movable clamp.

The terms "top dead centre" and "bottom dead centre" are used to refer to the positions of the movable clamp farthest from and nearest to the stationary clamp respectively in its reciprocatory cycle and are not intended to imply that reciprocation is vertical or that reciprocation is performed by means of a crank and connecting rod although the latter arrangement is preferred. Other mechanisms which are the equivalent of a crank and connecting rod such as an eccentric and a connecting rod or a cam and cam follower may be employed.

In an arrangement including a crank and connecting rod to provide reciprocation of the movable clamp the cam controlling the opening and closing of the movable clamp may be arranged to move as if it were fixed to the crank pin and in this case there may be a lever pivoted to the connecting rod and carrying the cam follower of the cam follower mechanism associated with the movable clamp and connected to the clamping mechanism of the movable clamp. The cam controlling the stationary clamp may rotate with the crank drive shaft. A possible alternative arrangement for controlling the opening and closing of the movable clamp is to have a stationary linear cam arranged parallel with the path along which the movable clamp reciprocates and a cam follower moving with the movable clamp and engaging the linear cam.

Preferably each clamp comprises a fixed jaw and a movable jaw mounted for reciprocation towards and away from the fixed jaw.

In order to resist any tendency of the strip to buckle between the movable and stationary clamps antibuckling guides may extend between the corresponding jaws on the movable and fixed clamps so that the strip will move between them. The guides may be extended beyond either of the clamps and will be arranged to slide relatively to at least one of the clamps.

When the feed mechanism is used with a press having a pilot pin or similar form of positive location for the strip the feed mechanism may include an override mechanism arranged to be operated by the press and to release the stationary clamp during the period of positive location. Triggering means may be provided whereby operation of the feed mechanism and operation of the press are coupled and one such triggering means comprises a cam carried by the crank drive means and a cam follower which is arranged to be coupled to the operating mechanism of the press.

The invention may be performed in various ways, and there will now be described by way of example a feed mechanism for strip metal in association with a hydraulic press having two stages of operation on the strip. The mechanism will be described with reference to the accompanying drawings from the various figures of which some parts have been omitted for the sake of clarity. In the drawings.

Figure 1:
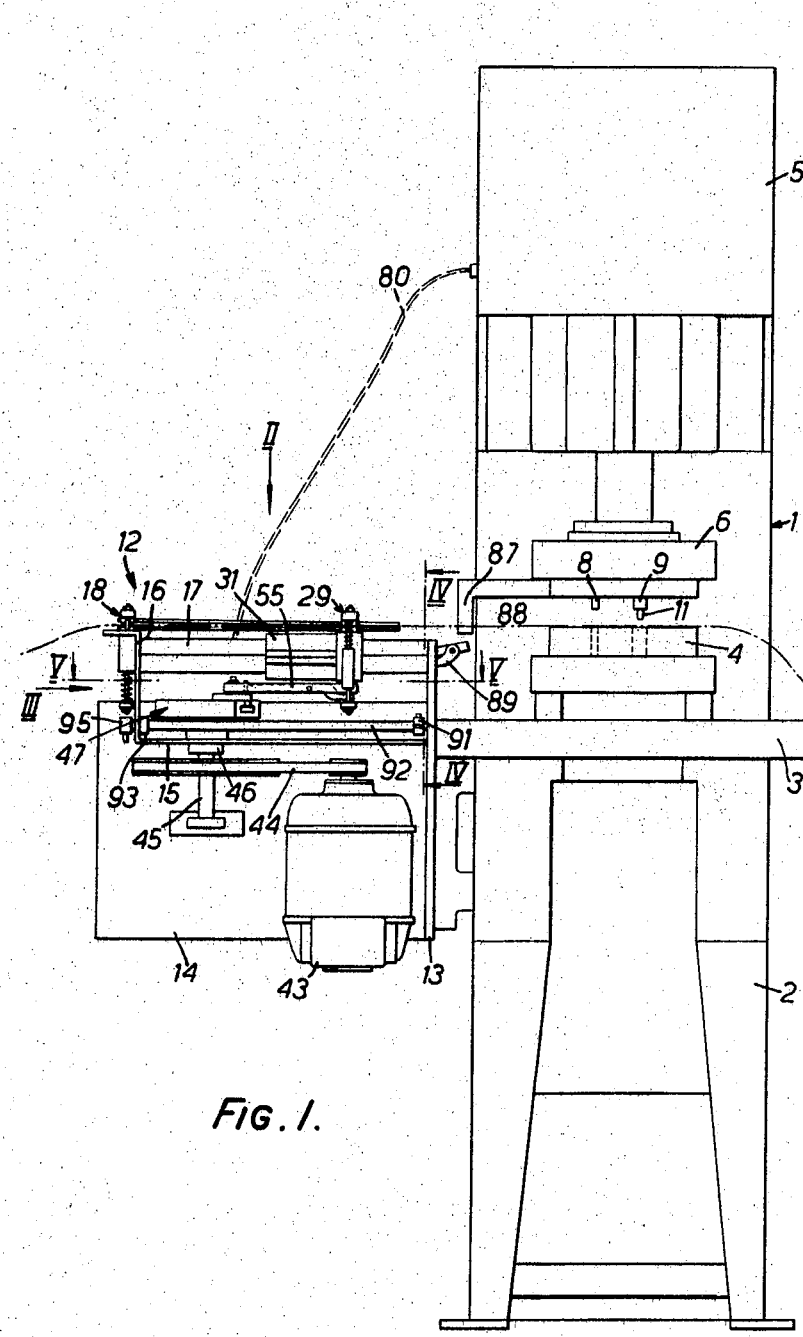
FIGURE 1 is a front elevation of the feed mechanism and the hydraulic press.
Figure 2:
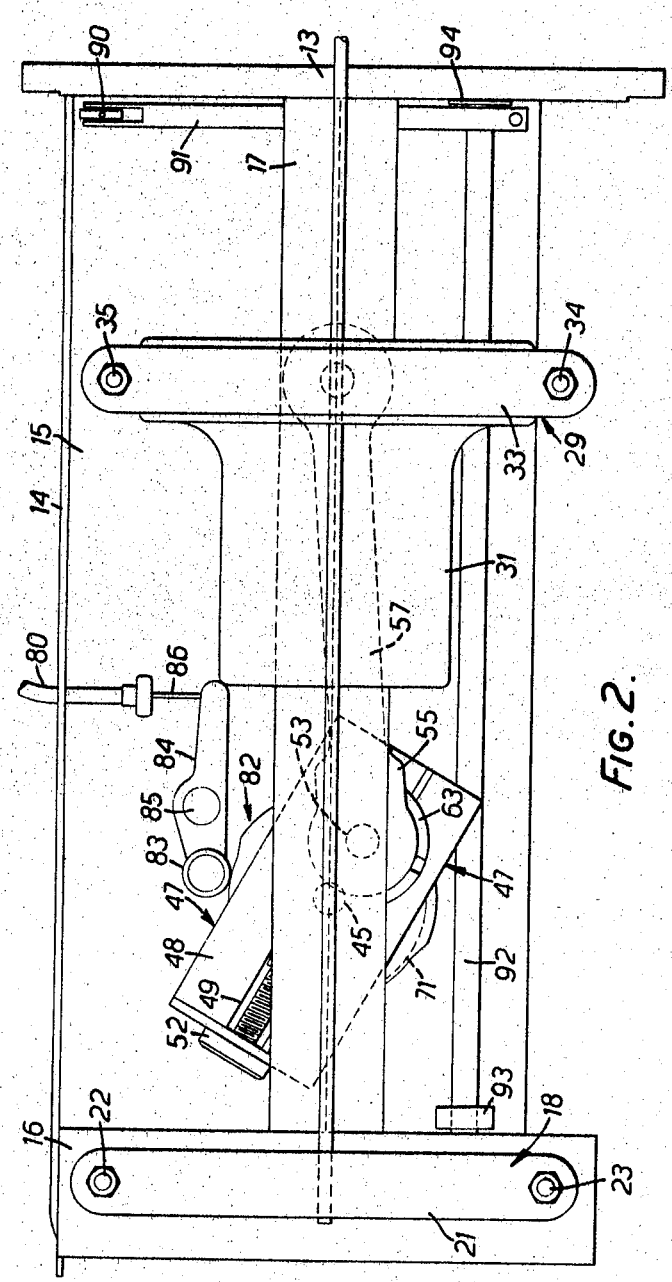
FIGURE 2 is a plan view of the feed mechanism as indicated by the arrow II in FIGURE 1.

Referring first to FIGURE 1, a press 1 has a stand 2 on which is supported a press table carrying a die 4. The press has a head 5 containing means for reciprocating the press member 6.

For the purposes of illustration, the press will be described as being used for the production of tag washers from metal strip 7. The first operation on the strip 7 is the stamping-out of the central hole of the washer which is performed by a punch 8 carried by the press member 6. The strip is then indexed forward by one increment and the next hole is stamped out by the punch 8. At the same time the tag washer containing the first stamped hole is stamped out from the strip by a second punch 9 carried by the press member 6. The lower end of the punch 9 is formed as a pilot pin 11 of the acorn type and as the press member descends the pilot pin engages the first stamped hole to locate the strip accurately so that registration of the hole and the periphery of the stamped-out washer will be accurate. Secured to one side of the press is the feed mechanism 12. The mechanism 12 is mounted on a framework which includes a vertical rectangular plate 13 which is secured to the press by clamps, not shown, which permit the height of the feed mechanism relative to the press table to be altered. A second vertical rectangular plate 14 extends from the first plate 13 at right-angles to it. A horizontal rectangular plate 15 is welded along one long side to the vertical plate 14 and along one short side to the vertical plate 13. Extending upwardly from the end of the plate 15 remote from the plate 13 is a bracket 16 of inverted L-shape. Extending between the bracket 16 and the vertical plate 13 is a rigid horizontal bar 17 of square cross-section.

Figure 3:
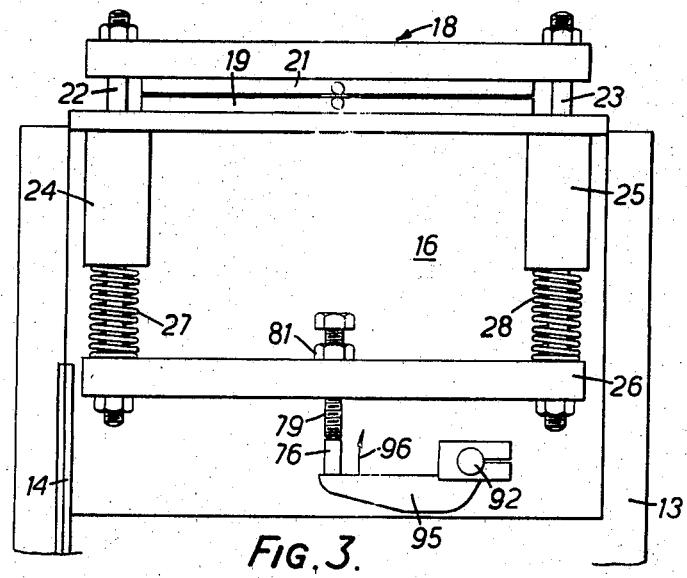
FIGURE 3 is an end elevation of the feed mechanism in the direction indicated by the arrow III in FIGURE 1.
Figure 4:
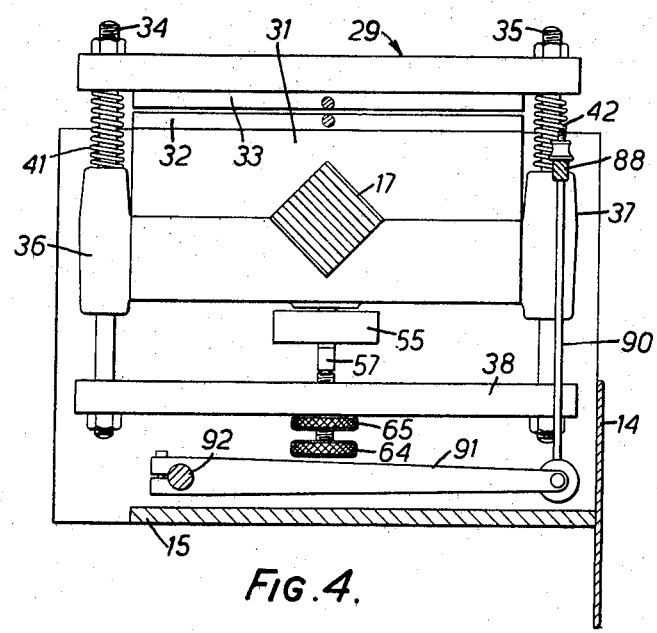
FIGURE 4 is a vertical section of the feed mechanism on the line IV–IV of FIGURE 1.

The bracket 16 carries a stationary clamp 18 which is shown in detail in FIGURE 3. The stationary clamp includes a fixed jaw 19 which is secured to the horizontal member of the bracket 16 and a movable jaw 21 which cooperates with the fixed jaw and is mounted for vertical movement towards and away from the fixed jaw by rods 22, 23 which slide in holes in bearing blocks 24, 25 secured to the bracket 16. The rods are connected together below the bearing blocks by a yoke 26 and compression springs 27, 28 are arranged around the rods 22, 23 between the yoke and the under-side of the bearing blocks 24, 25 thus biassing the yoke downwardly and hence biassing the movable jaw downwardly into contact with the fixed jaw.

A movable clamp 29 which is generally similar in construction to the stationary clamp 18 is mounted for reciprocation on the horizontal bar 17 between the stationary clamp and the press. The movable clamp comprises a slide block 31 formed in two parts connected together by bolts, the slide block sliding on the horizontal bar 17. A fixed jaw 32 is fixed to the top of the slide block 31 and there is a movable jaw 33 which co-operates with the fixed jaw 32 and is mounted for vertical movement towards and away from the fixed jaw by rods 34, 35 sliding in holes in bearing blocks 36, 37 formed integrally with the lower part of the mounting block 31. The rods are connected together below the bearing blocks by a yoke. Compression springs 41, 42 are positioned on the rods 34, 35 between the bearing blocks 36, 37 and the movable jaw 33 to bias the movable jaw upwards out of contact with the fixed jaw.

The vertical plate 14 carries an electric motor 43, shown in FIGURE 1, which drives, through reduction belting 44, a vertical drive shaft 45 which extends through a bearing 46 carried by the plate 15. Fixed to the upper end of the vertical drive shaft 46 is an assembly 47 which constitutes a crank of variable throw. The assembly includes a rectangular block 48 fixed to the upper end of the drive shaft 45 and having in its upper surface a groove 49 in which moves a slide 51 whose position can be adjusted and fixed by a screw 52. The slide 51 carries a crank pin 53 whose axis is vertical. It will be understood that by operation of the screw 52 the horizontal distance between the axis of the drive shaft 45 and the axis of the crank pin 53 can be varied and hence the throw of the crank can be varied.

The underside of the slide block 31 of the movable clamp has a pin 54 extending downwardly from it and pivoted to this pin is one end of a connecting rod 55 the other end of which is pivoted on the crank pin 53. Thus rotation of the drive shaft 45 will produce reciprocation of the movable clamp 29 towards and away from the stationary clamp 18 and the length of stroke of reciprocation can be adjusted by adjusting the throw of the crank.

There is a slot 56 extending through the connecting rod and housed in the slot is a generally horizontal lever 57 which is pivoted on a horizontal pin 58 extending across the slot. Extending from one end of the lever 57 is a pin 59 on which revolves a roller 61 which is housed in an aperture 62 extending through the connecting rod at one end of the slot 56. The roller 61 constitutes a cam follower which engages the profiled upper face of a cam disc 63 which is fixed to the crank pin 53 below the connecting rod. The crank pin is itself fixed to the slide 51. The other end of the lever 57 is cranked downwardly as can be seen in FIGURE 1 and its lower edge engages the upper end of a vertical screw 64 which extends upwardly through a hole in the centre of the yoke 38 of the movable clamp. A nut 65 is provided on the screw 64 to provide an adjustable connection between the screw and the yoke. The profiled upper surface of the cam disc 63 is in two zones 66, 67, the zone 66 being lower than the zone 67 and the two zones being connected by sloping portions 68, 69.

During part of a revolution of the drive shaft 45 the roller 61 will engage the raised zone 67 of the cam disc and will be raised and hence will lower the opposite end of the lever 57 and hence lower the yoke 38 and thus lower the movable jaw 33 of the movable clamp on to the fixed jaw 32 to close the movable clamp. During the remaining part of the revolution of the drive shaft the roller 61 will engage the lower zone 66 of the cam disc 63 and the movable clamp will be open.

The drive shaft 45 carries a cam disc 71 which is similar to the cam disc 63 and the lower face of which is divided into two zones 72, 73 which are engaged by a cam follower in the form of a roller 74 mounted on a pin 75 at one end of a generally horizontal lever 76 which is pivoted on a horizontal pin 77 carried on a bracket 78 extending from the bracket 16. The other end of the lever 76 engages the lower end of a screw 79 which is threaded into the yoke 26 of the fixed clamp and is shown in FIGURE 3. The screw 79 carries a locking nut 81. As in the case of the movable clamp the stationary clamp will be closed during part of the revolution of the drive shaft and will be open during other parts under control of the cam disc 71.

Figure 5:
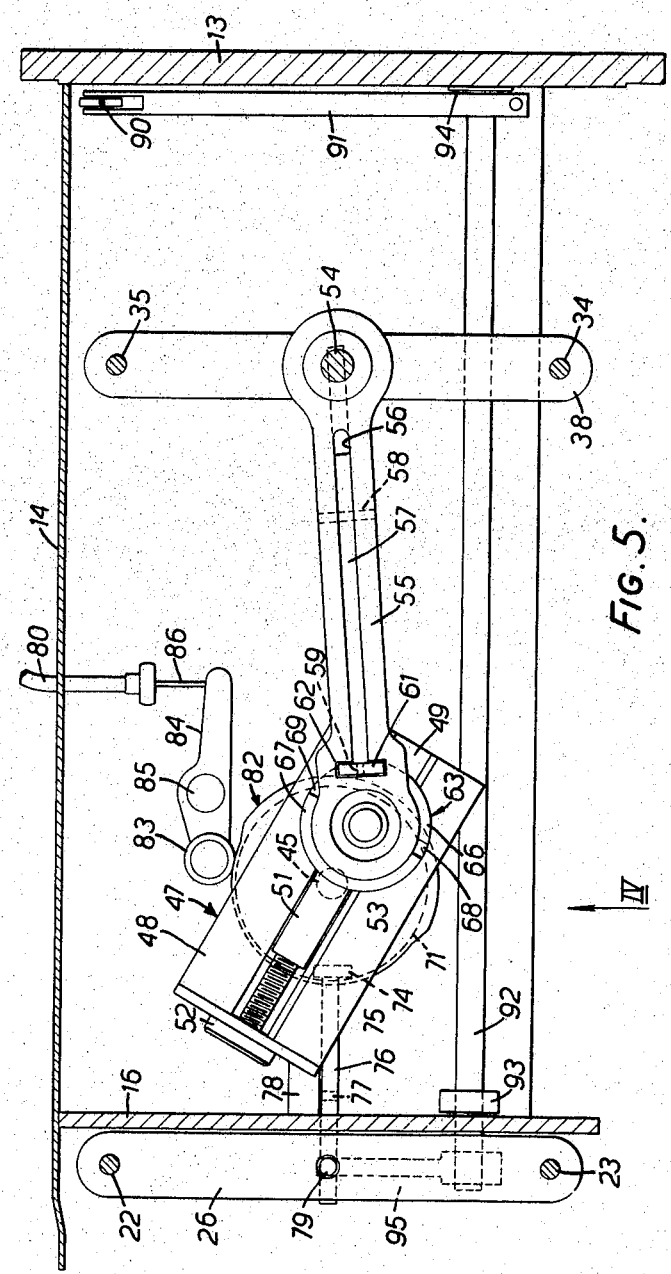
FIGURE 5 is a horizontal section of the feed mechanism on the line V—V of FIGURE 1.
Figure 6:
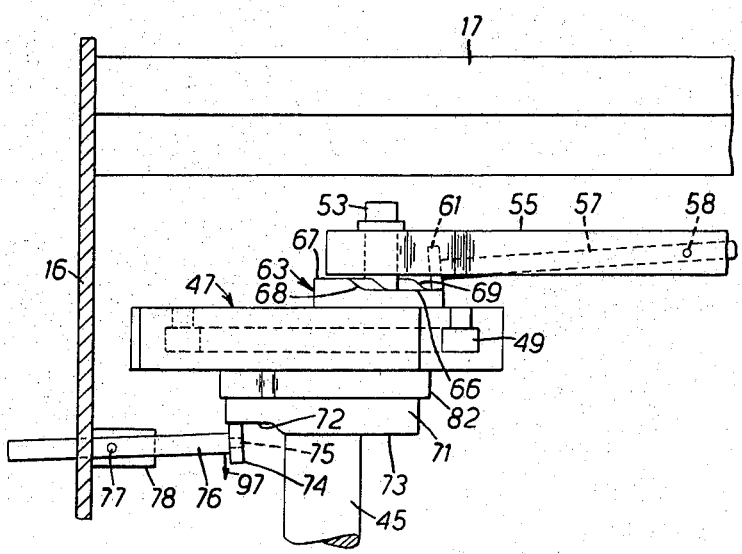
FIGURE 6 is a detailed front elevation of the crank and associated cams taken in the direction of the arrow VI in FIGURE 5.

Fixed to the drive shaft 45 is another cam disc 82 the periphery of which provides a cam surface and which is seen in FIGURES 5 and 6. Engaging the cam surface of the cam disc 82 is a roller 83 carried at one end of a lever 84 which is pivoted on a post 85 which projects upwardly from the horizontal plate 15. Fixed to the other end of the lever 84 is the core 86 of a Bowden cable 80, the other end of which is coupled to the control means of the press.

As has been mentioned, the press is provided with a pilot pin 11 of acorn form which enters a hole stamped in the strip in a previous cycle to provide positive location for the subsequent stamping operation. In order that the strip can be moved by the pilot pin the strip must be free, and this is achieved by an override mechanism which overrides the control of the stationary clamp provided by the cam disc 71. The override mechanism comprises a projection 87 carried by the press member 6 and arranged to engage one end of a lever 88 which is pivoted on a bracket 89 carried by the vertical plate 13. The opposite end of the lever 88 is connected by a vertical link 90 to an arm 91 which is fixed to one end of a horizontal shaft 92 which is located by collars 93, 94 in bearings in the plate 13 and the bracket 16 respectively. Fixed to the end of the shaft 92 remote from the arm 91 is a second arm 95 the free end of which extends under the end of the lever 76 immediately below the screw 79 fixed to the yoke 26 of the stationary clamp.

Operation of the feed mechanism is as follows. When the apparatus is to be used, the free end of a reel of strip 7 is passed between the jaws 19 and 21 of the stationary clamp 18, between the jaws 32, 33 of the movable clamp 29 and across the table of the press below the punches 8 and 9. The cycle of operation for one complete revolution of the drive shaft will now be described, starting approximately 5° before the movable clamp reaches bottom dead centre. During the 5° before the movable clamp reaches bottom dead centre the face cam 63 fixed to the crank pin 53 will cause the movable clamp to close on to the strip, gripping the strip on its flat face. During this period the linear motion of the movable clamp is very small as the clamp is close to the end of its stroke. At this time the stationary clamp is closed and thus at bottom dead centre the strip is clamped by both the movable and the stationary clamps. During the 5° following bottom dead centre the roller 74 moves on to the zone 73 of the cam disc 71 and the stationary clamp opens. As rotation of the drive shaft continues, the movable clamp will accelerate away from the stationary clamp reaching a maximum velocity at 90° from bottom dead centre and will then decelerate. During this movement the movable clamp is closed and the strip will move with it and be advanced through the press by an increment equal to the throw of the crank. During the last 5° before the top dead centre when the movable clamp will be moving extremely slowly, the roller 74 will move off the zone 73 of the disc 71 on to the zone 72 and the stationary clamp will close on to the strip and produce a braking effect on the strip. Thus at top dead centre the strip will be clamped by both the stationary and the movable clamps.

During the 5° following top dead centre the roller 61 will move from the zone 67 to the zone 66 of the cam disc 63 and the movable clamp will open. During the following 170° the movable clamp will return towards the bottom dead centre position but as it is open the strip will not move. Subject to operation of the override mechanism, the strip will be held absolutely stationary by the stationary clamp which is closed.

As the movable clamp is accelerating towards the stationary clamp the roller 83 will move from one zone to another zone of the cam disc 82 and this will result in a signal being transmitted through the Bowden cable 80 to the control mechanism of the press causing the press to operate. Thus the press member 6 will be moved downwardly towards the strip 7. Before the pilot pin 11 reaches the strip 7 the projection 87 carried by the press member 6 will engage the lever 88 which will move the link 90 upwardly, this movement being transmitted to the free end of the arm 95 which moves as indicated by the arrow 96. Thus the yoke 26 of the stationary clamp is moved upwardly and the stationary clamp is opened. At the same time the end of the lever 76 will be moved upwardly and hence the roller 74 will be moved downwardly away from the surface 72 of the cam disc 71, as indicated by the arrow 97 in FIGURE 6. Thus the control operation of the cam disc 71 is overridden and the strip 7 is released by the stationary clamp at the instant the leading end of the pilot pin 11 enters the previously punched hole in the strip 7. As soon as the press member 6 moves upwardly again the projection 87 releases the lever 88 and the stationary clamp again closes on the strip and the roller 74 again engages the zone 72 on the cam disc 71.

Five degrees before the bottom dead centre position is reached the roller 74 moves on to the zone 73 of the cam disc 71, the movable clamp will close and the cycle will be repeated.

What we claim as our invention and to secure by Letters Patent is:

1. A feed mechanism for material in continuous form comprising a stationary clamp for the material, a cam and cam follower mechanism for opening and closing the stationary clamp, a movable clamp for the material having a pair of jaws and mounted for reciprocation relative to the stationary clamp, rotary crank means, a connecting rod connecting said crank means to said movable clamp, a longitudinal slot in said connecting rod, a lever pivoted in said slot, connecting means between a first point on said lever and one of said jaws, a cam follower on said lever at a second point spaced from said first point, and a cam mounted for engagement by said cam follower.

2. A feed mechanism as claimed in claim 1 in which said cam follower comprises a roller mounted for rotation about an axis substantially coinciding with the longitudinal axis of said lever.

3. A feed mechanism as claimed in claim 1 in which said crank means comprises a crank pin carried by a rotary shaft and said cam surrounds said crank pin and is fixed to said shaft for rotation therewith.

4. A feed mechanism for material in continuous form comprising a frame, an operable stationary clamp mounted on said frame, an openable movable clamp mounted on said frame for reciprocation towards and away from said stationary clamp, a shaft mounted on said frame, driving means for said shaft, a crank pin mounted on said shaft for rotation about the axis of said shaft, a connecting rod connecting said crank pin to said movable clamp, a lever carried by said connecting rod, said lever being connected to said connecting rod at a location medially of the length of the lever for rocking movement about an axis transverse to the axis of said shaft, means operatively connecting one end of said lever to said openable movable clamp to actuate said clamp to the rocking movement of said lever, a cam follower on the opposite end of said lever, and a cam connected to said shaft for movement therewith and engaged by said cam follower to open and close said movable clamp in synchronism with the reciprocating movement of said clamp.

5. A feed mechanism according to claim 4, including a second cam mounted for rotation with said shaft, a second cam follower mounted for engagement with said second cam, and connecting means between said second cam follower and said stationary clamp.

6. A feed mechanism for material in continuous form comprising a frame, an openable stationary clamp mounted on said frame, a movable clamp mounted on said frame for reciprocation towards and away from said stationary clamp along a line, a shaft mounted for rotation about an axis perpendicular to said line, a crank pin mounted on said shaft eccentrically to said axis, a connecting rod connecting said crank pin to said movable clamp and movable in a plane perpendicular to said axis, a face cam connected to said crank pin for movement therewith and surrounding said crank pin, said face cam having a profiled surface facing axially with respect to said shaft, a lever extending along said connecting rod and pivoted on said connecting rod for rocking movement about an axis in said plane, a cam follower on said lever engaging said profiled surface of said cam, said movable clamp having a fixed jaw and a movable jaw movable towards and away from said fixed jaw in directions perpendicular to said plane, and connecting means between said connecting rod and said movable jaw.

7. A feed mechanism as claimed in claim 6 in which said stationary clamp includes a fixed jaw and a movable jaw movable towards and away from said fixed jaw in directions perpendicular to the plane of movement of said connecting rod and which includes a second face cam mounted on and for rotation with said shaft, a second lever pivoted on said frame about an axis in a plane parallel to said plane of movement of said connecting rod, a second cam follower on said second lever engaging said second face cam, and means operatively connecting said second lever to said movable jaw of said stationary clamp.

8. A feed mechanism for material in continuous form comprising a frame, an openable stationary clamp mounted on said frame and comprising a fixed jaw, a movable jaw, biasing means biasing said movable jaw towards said fixed jaw and a first abutment surface carried by said movable jaw and facing in the direction of movement of said movable jaw towards said fixed jaw, an openable movable clamp mounted on said frame for reciprocation towards and away from said stationary clamp, a drive shaft mounted on said frame, means driven by said shaft for reciprocating said movable clamp, cam and cam follower means for opening and closing said movable clamp, a cam driven by said shaft, a lever pivoted on said frame for movement about an axis perpendicular to the direction of movement of said movable jaw, a cam follower on said lever and engaging said cam, a second abutment surface on said lever facing said first abutment surface and movable in response to movements of the cam follower on said cam between a position in which the movable jaw is moved away from the fixed jaw and a position which permits the movable jaw to be moved towards the fixed jaw by the biasing means, a second lever pivoted on said frame and interposed between said abutments to transmit forces between them, an operating element mounted on said frame for engagement by a movable member on a machine tool associated with said feed mechanism, and a linkage connecting said operating element and said second lever, whereby movement of the movable member moves said second lever to move said movable jaw away from said fixed jaw.

References Cited by the Examiner

UNITED STATES PATENTS

| | | | |
|---|---|---|---|
| 703,183 | 6/02 | Chapin | 83—245 |
| 1,066,577 | 7/13 | Bertsch | 83—277 |
| 1,655,471 | 1/28 | Marcell | 83—282 X |
| 1,897,970 | 2/33 | Hofmann et al. | 83—282 X |
| 1,986,356 | 1/35 | Palucki | 226—162 |
| 2,342,049 | 2/44 | Holmbeck | 83—277 |

WILLIAM W. DYER, Jr., *Primary Examiner.*

LEON PEAR, ANDREW R. JUHASZ, *Examiner.*